(No Model.)

R. SQUIRES.
NUT LOCK.

No. 464,591. Patented Dec. 8, 1891.

Witnesses:

Inventor
Riley Squires.
By his Attorneys,

UNITED STATES PATENT OFFICE.

RILEY SQUIRES, OF OGALLALA, NEBRASKA.

NUT-LOCK.

SPECIFICATION forming part of Letters Patent No. 464,591, dated December 8, 1891.

Application filed September 23, 1890. Serial No. 365,919. (No model.)

*To all whom it may concern:*

Be it known that I, RILEY SQUIRES, a citizen of the United States, residing at Ogallala, in the county of Keith and State of Nebraska, have invented a new and useful Nut-Lock, of which the following is a specification.

This invention has relation to improvements in nut-locks, commonly known as "top-locks," the objects being to provide an extremely simple and thoroughly efficient means for locking the nuts or taps of bolts in position, and against any accidental displacement by reason of the jarring thereof, yet whereby the nut may be tightened or loosened slightly when desired. For this reason the nut-lock hereinafter described is especially designed for use upon the joints of railroad-rails, machinery, &c., where constant vibrations take place.

The invention consists in providing a bolt at its threaded end with a threaded opening, said threads being preferably disposed opposite to the exterior threads of the bolt, and in threading into said opening a spring-pin adapted to be bent over upon itself and upon the bolt and into a convenient recess formed in the walls of the nut or tap, whereby a retrograde movement upon the part of the nut or cap is impossible without first removing the pin.

Figure 1:
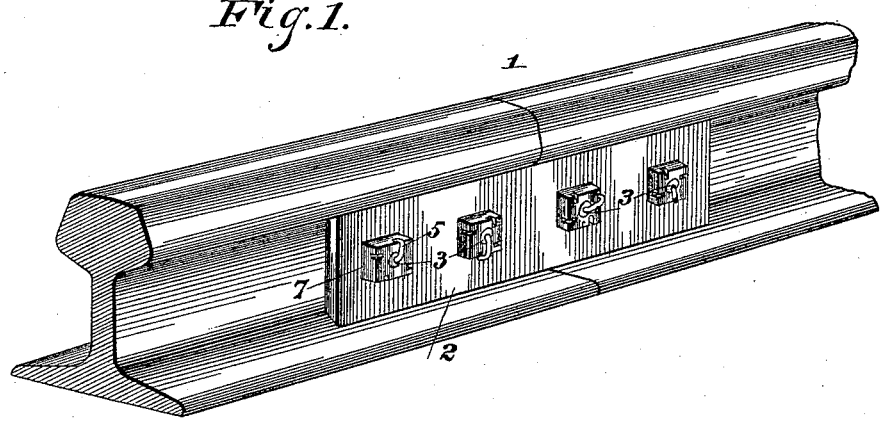
Figure 2:
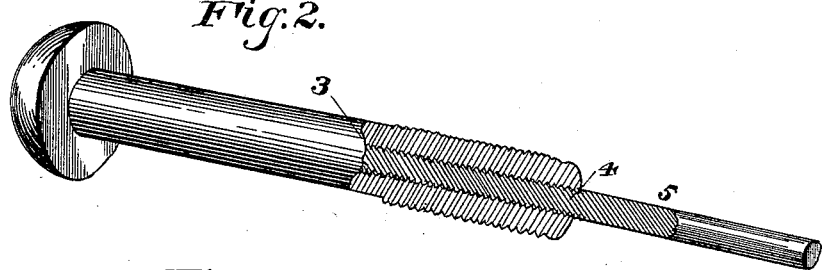
Figure 3:
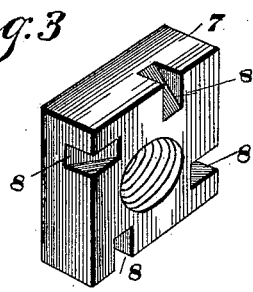

Referring to the drawings, Figure 1 is a perspective of a railway-joint, the nuts of the bolts of which are locked in accordance with my invention. Fig. 2 is a detail in section of the bolt. Fig. 3 is a similar view in perspective of the nut.

Like numerals of reference indicate like parts in all the figures of the drawings.

1 designates opposite rail-sections, the ends of which abut and are connected by the usual fish-plate 2, which together with the sections are provided with bolt-openings through which are inserted the transverse bolts 3. The bolts 3 are of the usual construction, with the exception that their threaded ends are provided with longitudinally-disposed threaded openings 4, said openings having their thread disposed opposite to the exterior threads of the bolt, and are therefore left-handed.

5 designates a steel or it may be malleable-iron locking pin, of cylindrical or it may be other shape in cross-section, one end of which is provided with a left-hand thread adapted to engage the threads of the opening in the bolt. The rod is considerably smaller in diameter than the bolt, so that the nut 7 may be most readily introduced over the pin and screwed home upon the bolt, and the rod is preferably of spring metal. The nut 7 has its four sides provided with recesses 8, extending obliquely through the same, and where polygonal nuts are employed said recesses may be increased in number. After the nut has been screwed home against the fish-plate the outer end of the rod is bent over so that its tip rests in whichever one of the recesses is most convenient and serves to prevent any turning of the nut. It will be apparent that by reason of the opposite disposition of the threads and the pin a retrograde movement of the pin and nut combined is impossible, because the unscrewing of the nut causes the screwing in of the rod, and hence longitudinal movements of these members toward each other. To remove the nut the free end of the pin must be first disengaged from the recess in which it is seated and the pin straightened out, so as to permit the withdrawal of the nut when unscrewed from the bolt. When it is desired to tighten or loosen the nut a trifle, as is frequently the case, the end of the rod is sprung laterally out of its recess and held out while the nut is turned, after which it is allowed to spring into the recess standing under such end after the nut is adjusted. After the adjustment of the nut, if the rod does not engage the nut, said rod is screwed into the bolt until it does.

Although I have herein illustrated and described my nut-lock in connection with a railway-joint, it will be understood that the same is as well adapted for the locking of nuts upon bolts in all kinds of machinery, and especially to that class of machinery where great agitation constantly takes place—as, for instance, thrashing and other agricultural machines.

It will be observed that the bolts to which my invention is added may be of the ordinary construction, requiring nothing further than the formation of the left-hand threaded bore.

Having described my invention, what I claim is—

The combination, with a bolt provided at its threaded end with a longitudinal opening threaded oppositely to the exterior of the bolt, of a nut on the bolt having recesses in its faces, and a rod screwed into said opening with its projecting end turned in and removably seated in one of said recesses, into which it presses radially of the nut, as and for the purpose described.

In testimony that I claim the foregoing as my own I have hereto affixed my signature in presence of two witnesses.

RILEY SQUIRES.

Witnesses:
C. C. PERVIER,
A. W. BOYDEN.